Patented Jan. 3, 1928.

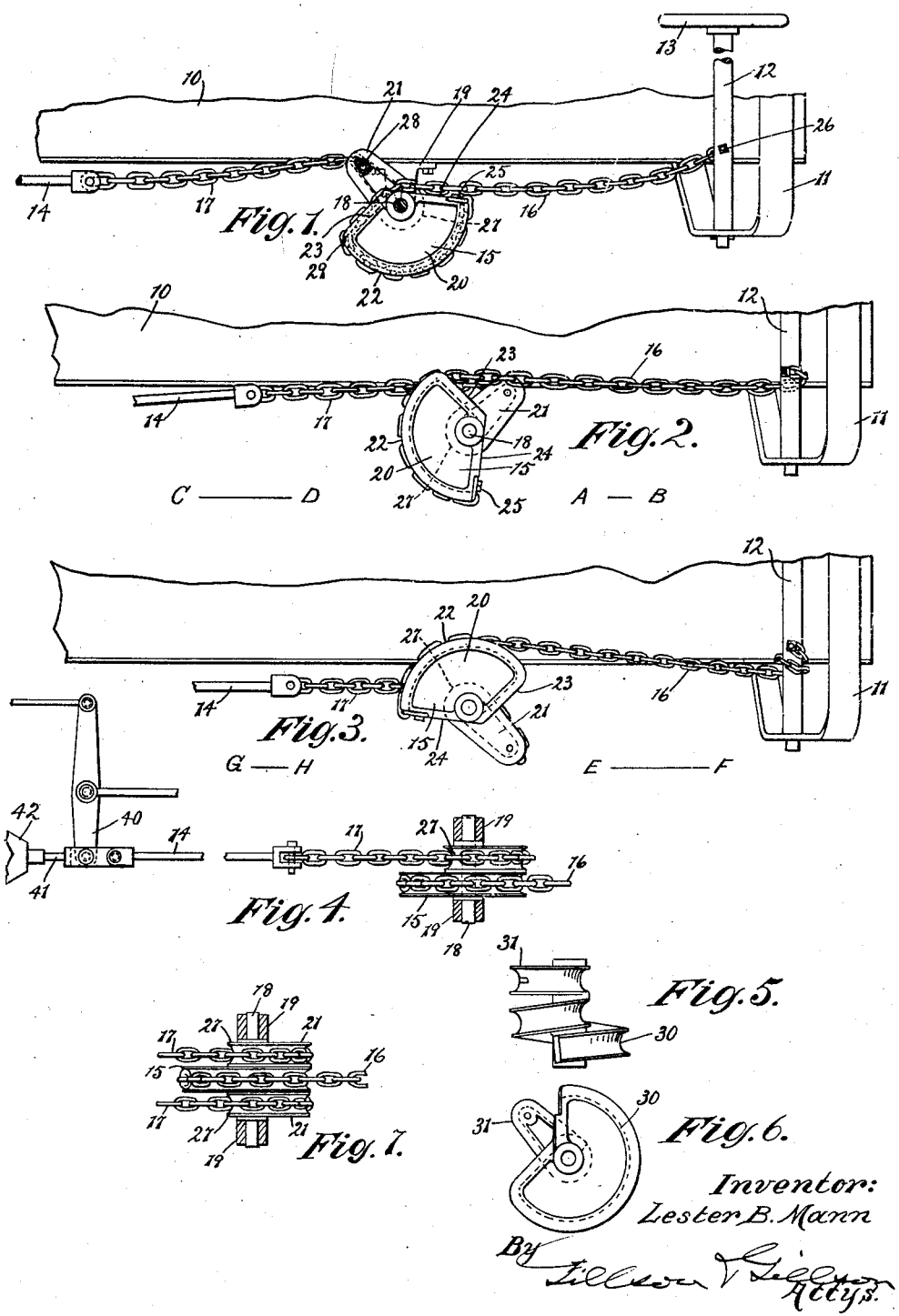

1,655,322

UNITED STATES PATENT OFFICE.

LESTER B. MANN, OF CHICAGO, ILLINOIS, ASSIGNOR TO THE UNIVERSAL DRAFT GEAR ATTACHMENT COMPANY, OF CHICAGO, ILLINOIS, A CORPORATION OF ILLINOIS.

BRAKE MECHANISM FOR RAILWAY CARS.

Application filed December 9, 1922. Serial No. 605,906.

This invention relates to brake mechanisms for railway cars and has for its principal object to permit the brakes to be applied by hand with speed and power comparable to that of the air brake apparatus.

This result is obtained by making use of the fact that an object travelling in a circular path will move in certain arcs, principally in one direction, and in other arcs principally in a direction transverse to the first movement; and the brake rigging includes a multiplying lever having two arms; one to receive the power from the brake staff and the other to transmit the power first with increased speed to take up the slack and then with increased force to apply the brakes.

Further objects and advantages of the invention will become apparent as the disclosure proceeds and the description is read in connection with the accompanying drawings, in which;

Fig. 1 is a side elevation of a brake mechanism embodying the principles of this invention and showing the parts in slack condition;

Fig. 2 is a similar view showing the parts with the slack taken up;

Fig. 3 is a similar view showing the parts with the brakes applied;

Figs. 4 and 7 are fragmentary plan views of the brake mechanism; and

Figs. 5 and 6 are plan and side elevations, respectively, of the modified form of multiplying lever.

Referring to the drawings, 10 indicates a car under-frame equipped with a brake step 11 in which is suitably journaled a brake staff 12 equipped with a hand-wheel 13. The usual hand brake rod is shown at 14 and leads to a brake lever 40 which is slidably connected by a push rod 41 with a piston operating in an air cylinder 42. All these parts may be of the usual or any preferred construction.

Interposed between the brake staff 12 and the brake rod 14 is an extensible and contractable connection composed principally of a multiplying lever generally indicated by 15 and two cables here illustrated by the chains 16 and 17. The multiplying lever is preferably journaled on shaft 18 mounted in suitable brackets 19, secured to the car under-frame.

The multiplying lever has an arm 20, which, for convenience, will be called the staff arm, and an arm 21 which, for convenience, will be called a brake arm. The staff arm has a peripheral working surface 22 and is here shown as somewhat segmental in form. The leading face 23 of this arm and the working surface 22 are preferably grooved or otherwise formed to receive the chain or cable 16 which has one end secured to the following face 24 of the staff arm by a suitable shackle 25, and is formed into a bight about the arm, with the opposite end connected to the brake staff at 26.

The brake arm 21 is preferably provided with a drum surface 27; and this surface and the periphery of the arm are preferably grooved to receive the chain 17 which is connected by a suitable shackle 28 to the arm at one end, and has its other end fastened to the brake rod 14.

In the arrangement shown, when the brake staff is operated the point 29, on the staff arm, will first move principally in a vertical direction or a direction transverse to the movement of the chain 16; and, this will continue through an arc of about 90°, when the parts assume the position illustrated in Fig. 2. During this movement, the brake arm also traverses an arc of approximately 90° in which the point of transmission of the power, approximately the shackle 28, moves principally in a direction parallel of movement of the chain 17 in taking up the slack and applying the brakes. Because the point 29 moves, for the most part, transversely to the direction of the movement of the staff chain 16, or the direction of the power of the brake staff, a very little movement of the staff chain will produce the quarter revolution of the multiplying lever. The result is that for a movement of the staff chain of a distance corresponding to the line A—B (Fig. 2), the brake chain will move the much greater distance represented by the line C—D (Fig. 2), and the slack is taken up quickly.

With 90° additional rotation, the parts will take the position shown in Fig. 3 and the staff chain will have moved through the distance represented by the line E—F, and the brake chain will have moved through a distance represented by the line G—H. During this movement the brake staff has been working with mechanical advantage, and in the last part of it has had the leverage represented by the difference between the length of the arm 20 and the radius of the drum section 27, which leverage will be continued through a considerable working range.

When the arms 20 and 21 are used singly and arranged side by side, there will be a twisting movement tending to rotate the lever sidewise; and if this becomes seriously objectionable one of the arms can be duplicated as indicated in Fig. 7 where there is a brake arm 21 on each side of the staff arm 20.

The embodiment shown, provides for an extremely quick take up of a great amount of slack and a very long range of operation in applying braking pressure. By varying the angle between the arm 21 and the leading faces 23 of the arm 20 and the initial positions of this arm and face, the take up can be varied both as to amount and speed. In some cases the multiplying effect of either arm will be sufficient to take up the slack and in those cases, one or both arms may be arranged at a different angle, or may be otherwise constructed and arranged. In other cases, a wider working range will be required, and this may be obtained by increasing the working surfaces either with or without a change of leverage.

As an illustration of one such variation, Figs. 5 and 6 show a multiplying lever in which the arm 30 corresponding to the arm 20, has a working surface of greater length and will permit the movement of taking up slack to extend through an angle of 180° and the braking range to be correspondingly lengthened. In these figures, the arm 31 is substantially the same as the arm 21 in the other figures, but, if desired, it may be made inclined similar to the arm 30.

The gist of the invention is in taking advantage of the fact stated, that an object traveling in a circle will change the direction of its principal movement as it passes through different arcs so that power may be sacrificed for speed where that is most desired, and speed may be sacrificed for power where that is most necessary; and variations in construction and arrangement to produce particular effects are contemplated and intended to be covered.

I claim as my invention:

1. In a brake mechanism for railway cars, the combination of a brake staff, a brake lever, a multiplying lever having a staff arm provided with a peripheral working surface and a substantially straight leading face, an individual brake arm and a drum surface adjacent to the brake arm, a staff chain connecting said brake staff and said staff arm and adapted to run over said peripheral working surface and engage said leading face during the inoperative position of said multiplying lever, and a brake chain connecting said brake arm and brake lever and adapted to run over said drum surface.

2. In a brake mechanism for railway cars, a power device for operating the brakes, means for transmitting power to the brakes, and a rotatable multiplying lever between said means and power device including two arms, one of said arms comprising a radially projecting lever portion and a drum surface of small radius, and the other arm comprising a drum surface of large radius and a leading face extending from said drum surface to a point near the axis of rotation.

3. In a brake mechanism for railway cars, the combination of a brake staff, a staff chain adapted to be wound on said staff for receiving power from the brake staff, a brake lever, a brake chain adapted to transmit power to the lever, and a multiplying lever having an individual segmental staff arm provided with a leading face having its outer portion engaging said staff chain, an individual brake arm connected with said brake chain and a winding surface adjacent to said brake arm about which said brake chain is adapted to be wound, said arms being so arranged that the leading face of said staff arm will move through an arc principally transverse to the staff chain, while the brake arm moves through an arc in which the movement of the point of the attachment of the brake chain is principally lengthwise of the brake chain for taking up the slack in said mechanism, and on a final application of the brake the staff arm will move substantially longitudinally of the staff chain and the brake arm transversely thereto.

4. In a brake mechanism for railway cars, the combination of an operating member, a brake lever, and extensible and contractible connection between said member and brake lever, comprising a rotatably mounted multiplying lever having a segmental arm, an individual brake arm, a winding surface adjacent to said brake arm, a connector secured to the outer end of said brake arm and connected to said brake lever and adapted to engage said winding surface, and a flexible member connected to said operating member and extending as a cord across said multiplying lever and engaging said segmental arm for taking up the slack of said mechanism and extending substantially tangent to said segmental arm during the final movement in applying the brakes.

LESTER B. MANN.